US012706836B2

(12) United States Patent
Pignataro et al.

(10) Patent No.: US 12,706,836 B2
(45) Date of Patent: Aug. 11, 2026

(54) NETWORK SERVICE CHAINS USING SUSTAINABILITY

(71) Applicant: Cisco Technology, Inc., San Jose, CA (US)

(72) Inventors: Carlos Pignataro, Cary, NC (US); Nagendra Kumar Nainar, Morrisville, NC (US); Sri Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 18/194,037

(22) Filed: Mar. 31, 2023

(65) Prior Publication Data

US 2024/0333633 A1 Oct. 3, 2024

(51) Int. Cl.
*H04L 45/302* (2022.01)
*H04L 67/63* (2022.01)

(52) U.S. Cl.
CPC ............ *H04L 45/302* (2013.01); *H04L 67/63* (2022.05)

(58) Field of Classification Search
CPC ....... H04L 45/00; H04L 45/302; H04L 67/50; H04L 67/60; H04L 67/63
See application file for complete search history.

(56) References Cited

U.S. PATENT DOCUMENTS

| | | | |
|---|---|---|---|
| 2013/0346247 A1 | 12/2013 | Bash et al. | |
| 2016/0043952 A1 | 2/2016 | Zhang et al. | |
| 2016/0315850 A1 | 10/2016 | Dara et al. | |
| 2017/0214627 A1* | 7/2017 | Zhang | H04L 67/1023 |
| 2017/0244631 A1 | 8/2017 | Guichard et al. | |
| 2017/0251065 A1* | 8/2017 | Furr | H04L 45/64 |
| 2018/0041524 A1* | 2/2018 | Reddy | H04L 63/1416 |
| 2018/0091420 A1* | 3/2018 | Drake | H04L 45/033 |
| 2018/0159765 A1* | 6/2018 | Shi | H04L 45/74 |
| 2019/0028384 A1* | 1/2019 | Penno | H04L 45/306 |
| 2021/0119696 A1* | 4/2021 | Shah | H04W 88/16 |

(Continued)

OTHER PUBLICATIONS

PCT/US2024/021230 filed Mar. 22, 2024 International Search Report and Written Opinion dated Jul. 30, 2024.

(Continued)

*Primary Examiner* — Jeong S Park
(74) *Attorney, Agent, or Firm* — Rutan & Tucker, LLP; Ravi Mohan; Marc A. McClain

(57) ABSTRACT

Network energy efficiency and green power selection may be optimized by employing graph-oriented service chains configured to share sustainability attributes and metadata augmentation. More specifically, network Service Function Chain (SFC) creation can include a set of power and energy-specific and sustainable attributes. In general, the goal of SFC is to enable the creation of a service path that matches the specific needs of an application or service. SFCs are composed of a sequence of network functions, such as firewalls, load balancers, intrusion detection systems, and other services. Each network function performs a specific task on the network traffic, and the packets are passed from one function to the next until they reach their destination. Overall, SFCs are a powerful tool for managing complex network environments, enabling network administrators to deploy and manage network services more efficiently and effectively.

20 Claims, 15 Drawing Sheets

(56) References Cited

U.S. PATENT DOCUMENTS

| | | | | |
|---|---|---|---|---|
| 2022/0150160 | A1* | 5/2022 | Kumar | H04L 67/63 |
| 2024/0137834 | A1* | 4/2024 | Eleftheriadis | H04W 52/04 |
| 2024/0187340 | A1* | 6/2024 | Ding | H04L 45/655 |

OTHER PUBLICATIONS

Sun Gang et al: "Energy-Efficient Provisioning for Service Function Chains to Support Delay-Sensitive Applications in Network Function Virtualization", IEEE Internet of Things Journal, IEEE, USA, vol. 7 No. 7, Jan. 31, 2020 (Jan. 31, 2020).

Zhang Xiaoning et al: "Near-Optimal Energy-Efficient Algorithm for Virtual 26 Network Function Placement", IEEE Transactions on Cloud Computing, IEEE, vol. 10, No. 1, Oct. 15, 2019 (Oct. 15, 2019).

Hantouti, H., et al. "Service Function Chaining in 5G & Beyond Networks: Challenges and Open Research Issues," ArXiv, Feb. 19, 2020., https://arxiv.org/ftp/arxiv/papers/2201/2201.05455.pdf.

Hussain, Monowar. "Concept of NSH and Metadata: Paving the creation of new transport agonistic Service Plane in 5G era," LinkedIn, Oct. 16, 2021, https://www.linkedin.com/pulse/concept-nsh-metadata-paving-creation-new-transport-service-hossain?trk=articles_directory.

* cited by examiner

S1
S2
L4
L11
R3
L9
L3
R5
INTERNET
L8
R2
L10
L7
L13
L2
R4
L12
802.11
W2
L6
R1
L5
L1
W1
L15
L14
200
U1
U2

600
APP1
610
606
SC
611
VIDEO CODEX (HIGH-RES)
620
VIDEO CODEX (LOW-RES)
630
AUDIO CODEX (HIGH-RES)
621
AUDIO CODEX (LOW-RES)
631
GPU RENDERING (HIGH-RES)
622
GPU RENDERING (LOW-RES)
632
640
641
642
643
APP2
650
601
IP
NSH (POWER)
TRAFFIC
ID SFP-ID, SI
SKIP OPTIONAL, ID CODEC TYPE, ETC.

| SERVICE PATH ID | SERVICE INDEX | SERVICE FUNCTION | CONDITION |
|---|---|---|---|
| 100 | 10 | ADSPLICE | IF POWER_LEVEL < 70% OR IF POWER_SOURCE = SOLAR |

800A

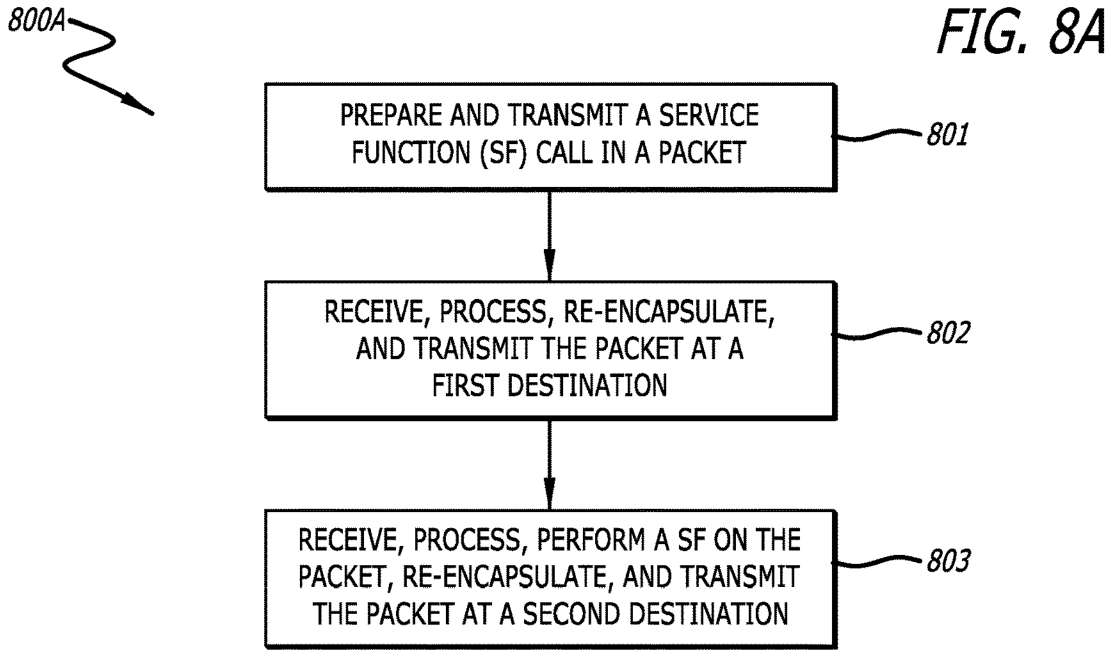

FIG. 8A
PREPARE AND TRANSMIT A SERVICE FUNCTION (SF) CALL IN A PACKET
801
RECEIVE, PROCESS, RE-ENCAPSULATE, AND TRANSMIT THE PACKET AT A FIRST DESTINATION
802
RECEIVE, PROCESS, PERFORM A SF ON THE PACKET, RE-ENCAPSULATE, AND TRANSMIT THE PACKET AT A SECOND DESTINATION
803
800B

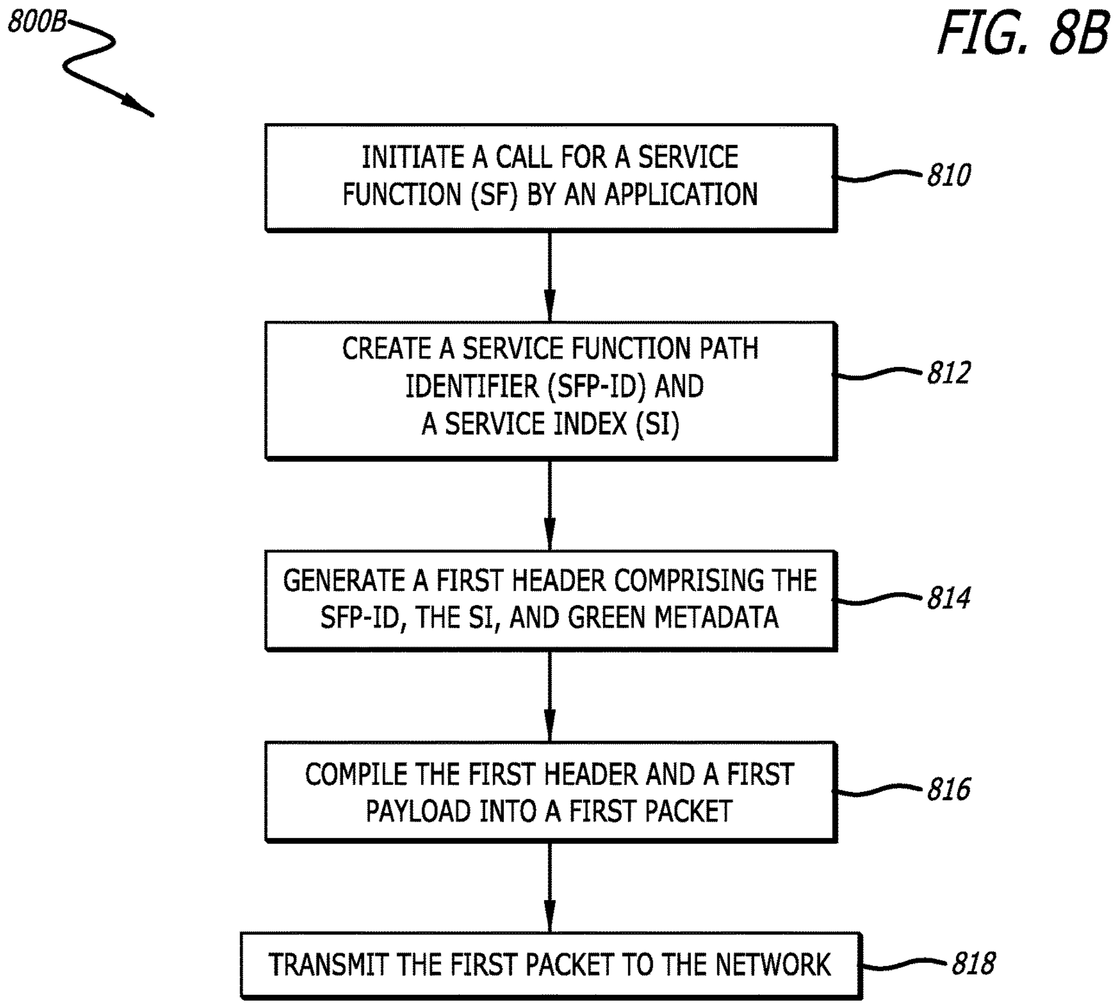

FIG. 8B
INITIATE A CALL FOR A SERVICE FUNCTION (SF) BY AN APPLICATION
810
CREATE A SERVICE FUNCTION PATH IDENTIFIER (SFP-ID) AND A SERVICE INDEX (SI)
812
GENERATE A FIRST HEADER COMPRISING THE SFP-ID, THE SI, AND GREEN METADATA
814
COMPILE THE FIRST HEADER AND A FIRST PAYLOAD INTO A FIRST PACKET
816
TRANSMIT THE FIRST PACKET TO THE NETWORK
818

800C

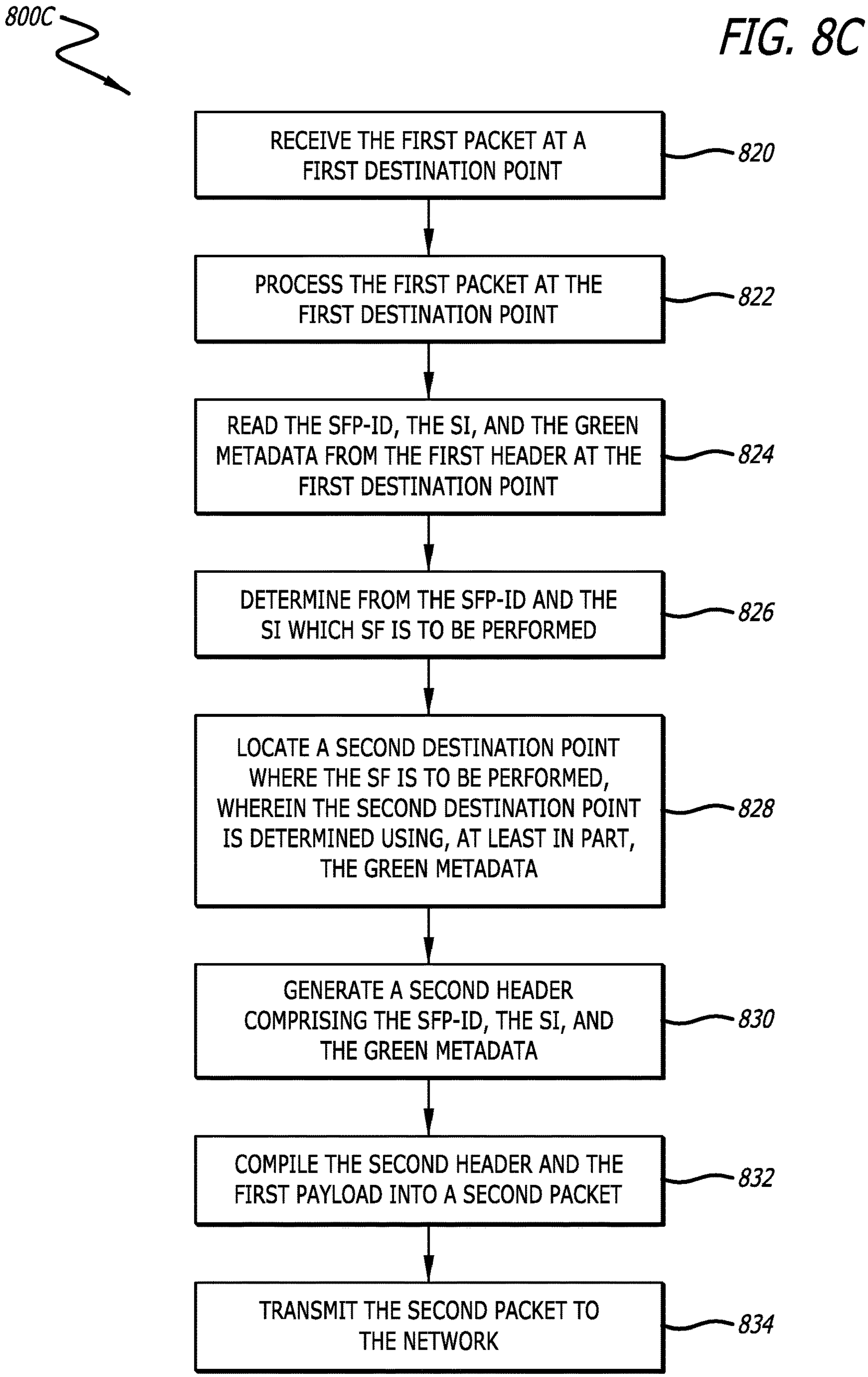

FIG. 8C
RECEIVE THE FIRST PACKET AT A FIRST DESTINATION POINT
820
PROCESS THE FIRST PACKET AT THE FIRST DESTINATION POINT
822
READ THE SFP-ID, THE SI, AND THE GREEN METADATA FROM THE FIRST HEADER AT THE FIRST DESTINATION POINT
824
DETERMINE FROM THE SFP-ID AND THE SI WHICH SF IS TO BE PERFORMED
826
LOCATE A SECOND DESTINATION POINT WHERE THE SF IS TO BE PERFORMED, WHEREIN THE SECOND DESTINATION POINT IS DETERMINED USING, AT LEAST IN PART, THE GREEN METADATA
828
GENERATE A SECOND HEADER COMPRISING THE SFP-ID, THE SI, AND THE GREEN METADATA
830
COMPILE THE SECOND HEADER AND THE FIRST PAYLOAD INTO A SECOND PACKET
832
TRANSMIT THE SECOND PACKET TO THE NETWORK
834

800D

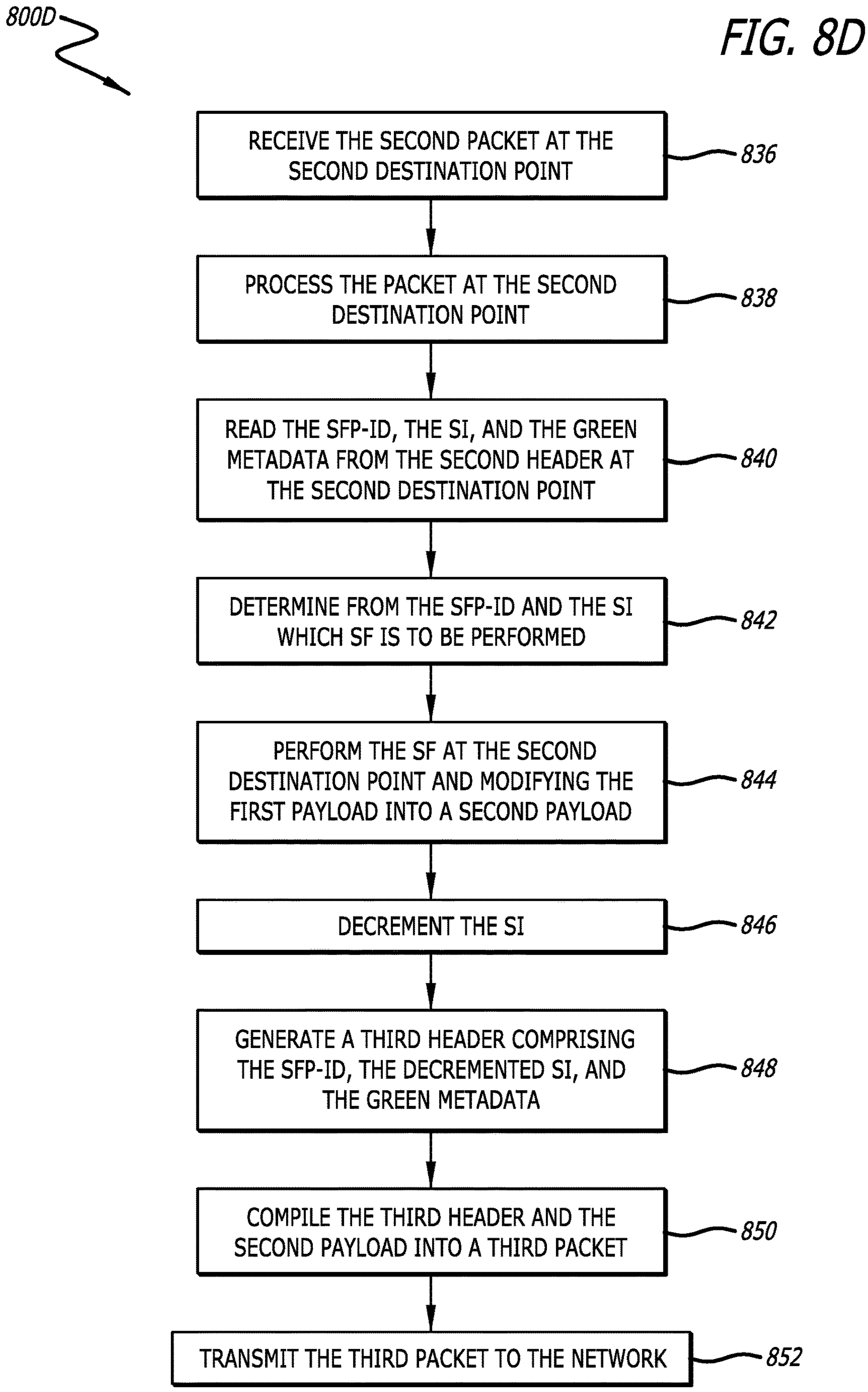

FIG. 8D
RECEIVE THE SECOND PACKET AT THE SECOND DESTINATION POINT
836
PROCESS THE PACKET AT THE SECOND DESTINATION POINT
838
READ THE SFP-ID, THE SI, AND THE GREEN METADATA FROM THE SECOND HEADER AT THE SECOND DESTINATION POINT
840
DETERMINE FROM THE SFP-ID AND THE SI WHICH SF IS TO BE PERFORMED
842
PERFORM THE SF AT THE SECOND DESTINATION POINT AND MODIFYING THE FIRST PAYLOAD INTO A SECOND PAYLOAD
844
DECREMENT THE SI
846
GENERATE A THIRD HEADER COMPRISING THE SFP-ID, THE DECREMENTED SI, AND THE GREEN METADATA
848
COMPILE THE THIRD HEADER AND THE SECOND PAYLOAD INTO A THIRD PACKET
850
TRANSMIT THE THIRD PACKET TO THE NETWORK
852

940
LOCAL AREA NETWORK
900
DEVICE(S)
912
NETWORK INTERFACE CONTROLLER
916
INPUT/OUTPUT CONTROLLER
906
CHIPSET
PROCESSOR(S)
RAM
ROM
STORAGE CONTROLLER
904
908
910
914
918
STORAGE
920
OPERATING SYSTEM
PROGRAMS
922
924
SERVICE FUNCTION LOGIC
MACHINE-LEARNING MODEL
926
928
930
932
SERVICE FUNCTION PATH DATA
HEADER DATA
GREEN METADATA
902
ENVIRONMENT

NETWORK SERVICE CHAINS USING SUSTAINABILITY

FIELD

The present disclosure relates to network routing. More particularly, the present disclosure relates to graph-oriented service chains configured to share sustainability attributes and metadata augmentation.

BACKGROUND

Network header instructions are a crucial component of data transmission over a network. The header is a block of data added to the beginning of a packet that contains information regarding the packet's destination, source, and other details needed for proper routing and delivery. Header instructions typically include source and destination IP addresses, protocol type, time-to-live (TTL) value, and other metadata.

Header instructions may assist network administrators in managing network traffic, troubleshooting various network issues, and enforcing security policies. They may also be used to allow routers to identify an intended recipient of a packet and the path the packet should take to reach its destination.

Similarly, network service headers are information blocks attached to the beginning of network packets that contain specific instructions for how the packet should be processed by a particular network service. These headers are used to enable various network services such as firewalls, load balancers, and proxies to inspect and manipulate network traffic. Service headers can contain information such as session IDs, authentication tokens, and protocol-specific instructions, allowing network services to identify and manipulate network traffic according to the needs of the service. By enabling network services to operate on specific aspects of network traffic, service headers play a crucial role in ensuring efficient and secure data transmission over complex network environments. However, these techniques ignore energy efficiency and power source information, thereby limiting the amount of sustainability principles and decisions that can occur within these configurations.

BRIEF DESCRIPTION OF DRAWINGS

The above and other aspects, features, and advantages of several embodiments of the present disclosure will be more apparent from the following description as presented in conjunction with the following several figures of the drawings.

FIG. 8A is a flowchart of a process of the operation of a network in accordance with an embodiment of the invention;

FIG. 8B is a flowchart of a process of the operation of a network in accordance with an embodiment of the invention;

FIG. 8C is a flowchart of a process of the operation of a network in accordance with an embodiment of the invention;

FIG. 8D is a flowchart of a process of the operation of a network in accordance with an embodiment of the invention.

Figure 1A:
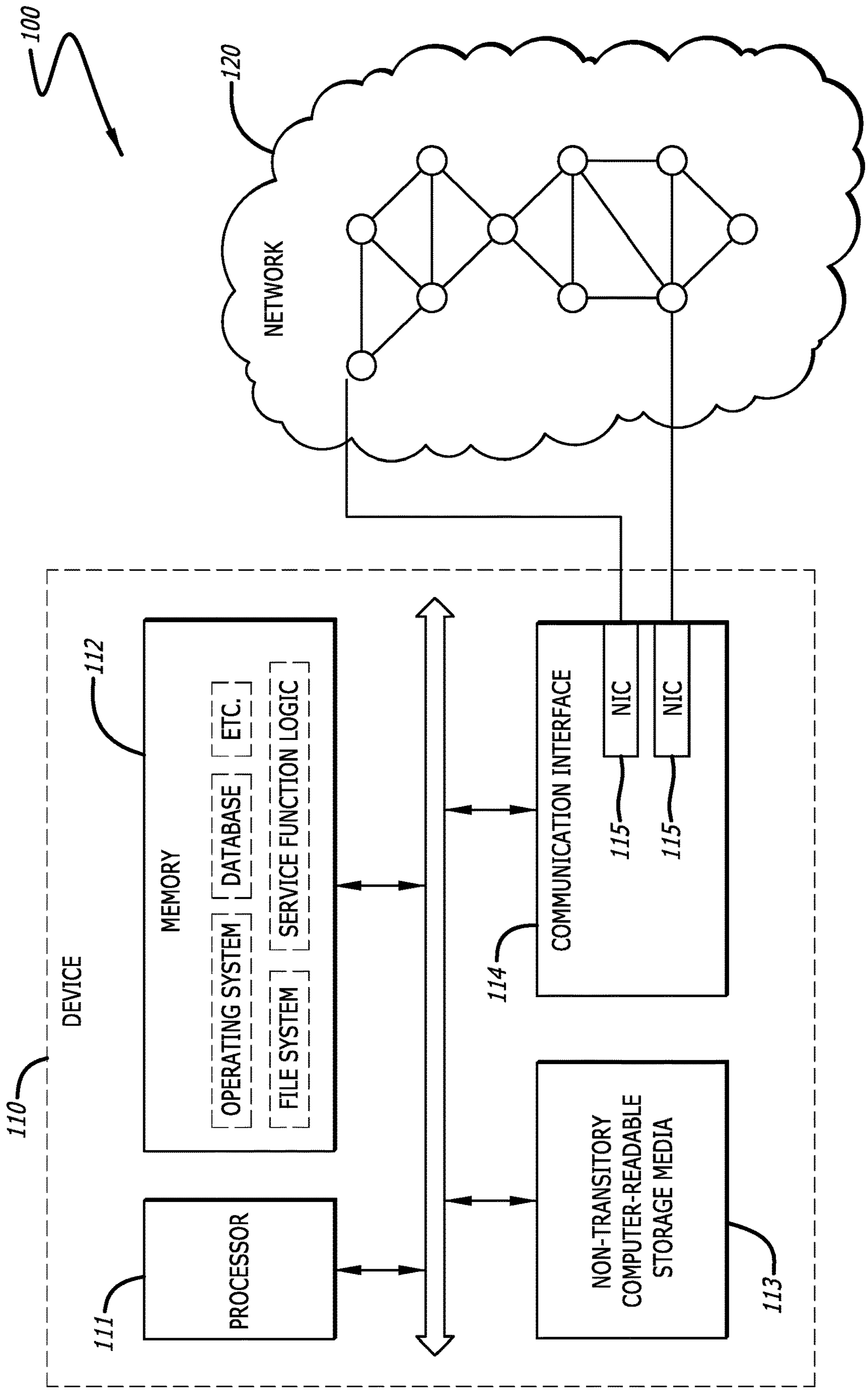
FIG. 1A is a block diagram of a device in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements to facilitate understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

Based on the issues above, the teachings of this disclosure may provide for more sustainable solutions to networking decisions by employing graph-oriented service chains configured to share sustainability attributes and metadata augmentation that may enhance access network energy efficiency and green power selection. More specifically, network Service Function Chain (SFC) creation can include a set of power and energy-specific and sustainable attributes.

In general, the goal of SFC is to enable the creation of a service path that matches the specific needs of an application or service. SFCs are composed of a sequence of network functions, such as firewalls, load balancers, intrusion detection systems, and other services. Each network function performs a specific task on the network traffic, and the packets are passed from one function to the next until they reach their destination. Overall, SFCs are a powerful tool for managing complex network environments, enabling network administrators to deploy and manage network services more efficiently and effectively. These processes and operations can be carried out with one or more network entities (NEs) that can be directed to carry out methods described herein within a standard network device, or a virtualized service that can be offered for sale.

Relatedly, a Service Function Path (SFP) can be considered a sequence of network functions that are applied to packets or flows to provide specific services. These functions may include tasks such as traffic inspection, encryption, compression, or quality of service (QoS) enforcement. An SFP is typically defined by a network operator or service provider to describe the sequence of service functions that a packet or flow must traverse to receive the desired service. The SFP may be implemented using a variety of techniques, such as network function virtualization (NFV) or software-defined networking (SDN). The SFP can be thought of as a virtual service chain that guides traffic through the network functions in a particular order. The SFP can be dynamically adjusted based on changing network conditions, service requirements, or other factors. For example, if a network link becomes congested, the SFP may be adjusted to redirect traffic to a different set of network functions to improve performance. By defining a specific SFP for each service, service providers can ensure that traffic receives the appropriate treatment and quality of service, while also simplifying network management and reducing costs.

SFPs and SFCs are related concepts in networking systems, such as network function virtualization (NFV), but they are not exactly the same thing. For example, an SFC is a sequence of network service functions (NSFs) that are chained together to process traffic flows. Each service function in the chain performs a specific network task such as firewalling, load balancing, or deep packet inspection. An SFC defines the order and parameters for the network functions that must be applied to the traffic flow. On the other hand, an SFP is a specific path through a set of NSFs that a particular traffic flow must traverse to achieve a specific network function. The SFP defines the sequence of NSFs that a traffic flow must traverse and also the specific instances of each NSF that must be used. In short, an SFC defines the overall sequence of NSFs in a service chain, while an SFP specifies the specific sequence of NSFs and their instances that must be used for a particular traffic flow. In practice, SFPs are often dynamically created by the network based on the requirements of a specific service request, while SFCs are pre-configured and deployed in the network infrastructure.

As such, a Service Function Path Identifier (SFP-ID) is a unique identifier used in various systems, such as network function virtualization (NFV) to identify a specific path through a series of network service functions. The SFP-ID can be used to identify the specific sequence of network functions that a particular packet must traverse. The SFP-ID is often a part of the metadata associated with a packet as it moves through the network and is used by the network to ensure that the packet is routed correctly through the appropriate sequence of network functions. The SFP-ID can be created when the SFC is instantiated, and is typically a string of characters or numbers that uniquely identifies the specific sequence of network functions that make up the service chain.

The teachings of this disclosure may be generalized to any service function chaining realization technology, without limitation. Some embodiments may include using one or more headers, such as, but not limited to, Network Service Headers (NSHs). NSH is a protocol header used in various systems, such a network function virtualization NFV to encapsulate and transport data packets through a series of network service functions (NSFs) in an SFC. The NSH header can be added to the beginning of the packet and may include various metadata. In a number of embodiments, NSHs may carry an SFP-ID and other metadata, including green metadata. Alternatively, Segment Routing IPv6 (SRv6) may be used for other embodiments, and Multi-Protocol Label Switching (MPLS) labels may be used for yet other embodiments, etc.

By way of non-limiting example, the term “green” may refer to any choice that reduces dependence on “dirty” energy sources such as fossil fuels, reduces greenhouse gas emissions, selects lower power choices of network routing paths, switches, routers, servers, etc., choices of where to execute service functions, etc. Thus, the term “green metadata” may refer to information related to making network routing and function decisions in favor of more sustainable alternatives. Such information may include geolocation, energy types and efficiency, the level of equal-cost multipaths (ECMP), battery levels of client devices, etc.

More broadly, “green metadata” may also refer to metadata that provides information regarding environmental impact of various network devices and infrastructure. This could include information regarding the energy consumption of one or more network devices, the efficiency of one or more network protocols, or the carbon footprint of one or more network operations. For example, network devices could be labeled with information regarding their energy consumption in watts, or network protocols could be designed to minimize data transfer and reduce energy usage. It should be appreciated that these types of metadata could be used by network administrators and businesses to make more sustainable choices when designing and operating computer networks, without limitation.

It is recognized that the terms “power” and “energy” are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like “power lines,” “power grids,” power source,” “power consumption,” and “power plant” when describing energy delivery and utilization, even though those skilled in the art will recognize that those elements are delivering or processing energy (specifically electricity) at a certain rate of power. References to these terms are utilized herein specifically to increase the ease of reading.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

For example, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

The sustainability-related attributes or "green" metadata may be used to determine which service functions are to be performed or skipped by the traffic. The energy attributes in the incoming NSH header can be used by the SFF to identify if the local SF can be skipped or applied. In collaborative applications or platforms that rely on video and/or audio for conferencing, online meetings, screen share, and webinars, the compression levels, as well as camera power, may be set as needed to reduce power. Including the ultimate endpoint for selecting routes through the network may be employed. Power, energy-specific, and sustainable attributes may be included at the time of SFC creation. Persons skilled in the art will appreciate many more possibilities after reviewing the disclosure and the drawings.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "logic," "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but is not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computers and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, a programmable array logic, a programmable logic device, or the like (e.g., as firmware, a netlist, or the like). A circuit may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B, and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1A, a block diagram of a network in accordance with an embodiment of the invention is shown. Exemplary network 100 may comprise a device 110 and a network 120. Device 110 may be a node on network 120. Device 110 may comprise one or more processors 111 and a memory 112. Memory 112 may be where various client apps are stored during runtime. Such clients may include an operating system, a database, a file system, a service function logic, etc.

Device 110 may also include a non-transitory computer-readable storage media 113 where certain types of instructions and data for execution on the processors 111 are stored. The storage media 113 may comprise hard disk drives, solid state drives, or other forms of persistent and non-transitory storage, including the operating system, a database, a file system, a service function logic, etc., mentioned above.

Also present in device 110 may be a communications interface 114 for interfacing device 110 with network 120. Communications interface 114 may comprise one or more Network Interface Controllers/Cards (NICs) 115 or similar devices, which may be coupled to other nodes in network 120. Two NICs 115 are shown, but the exact number may be determined by the network administrator.

Network 120 may comprise a plurality of nodes and links. The two NICs 115 shown in communications interface 114 may be coupled via links to other nodes in network 120. The number of nodes, links, and topologies can vary considerably, and network 120 is exemplary only. Network 120 may be any size up to and including the entire Internet.

Figure 1B:
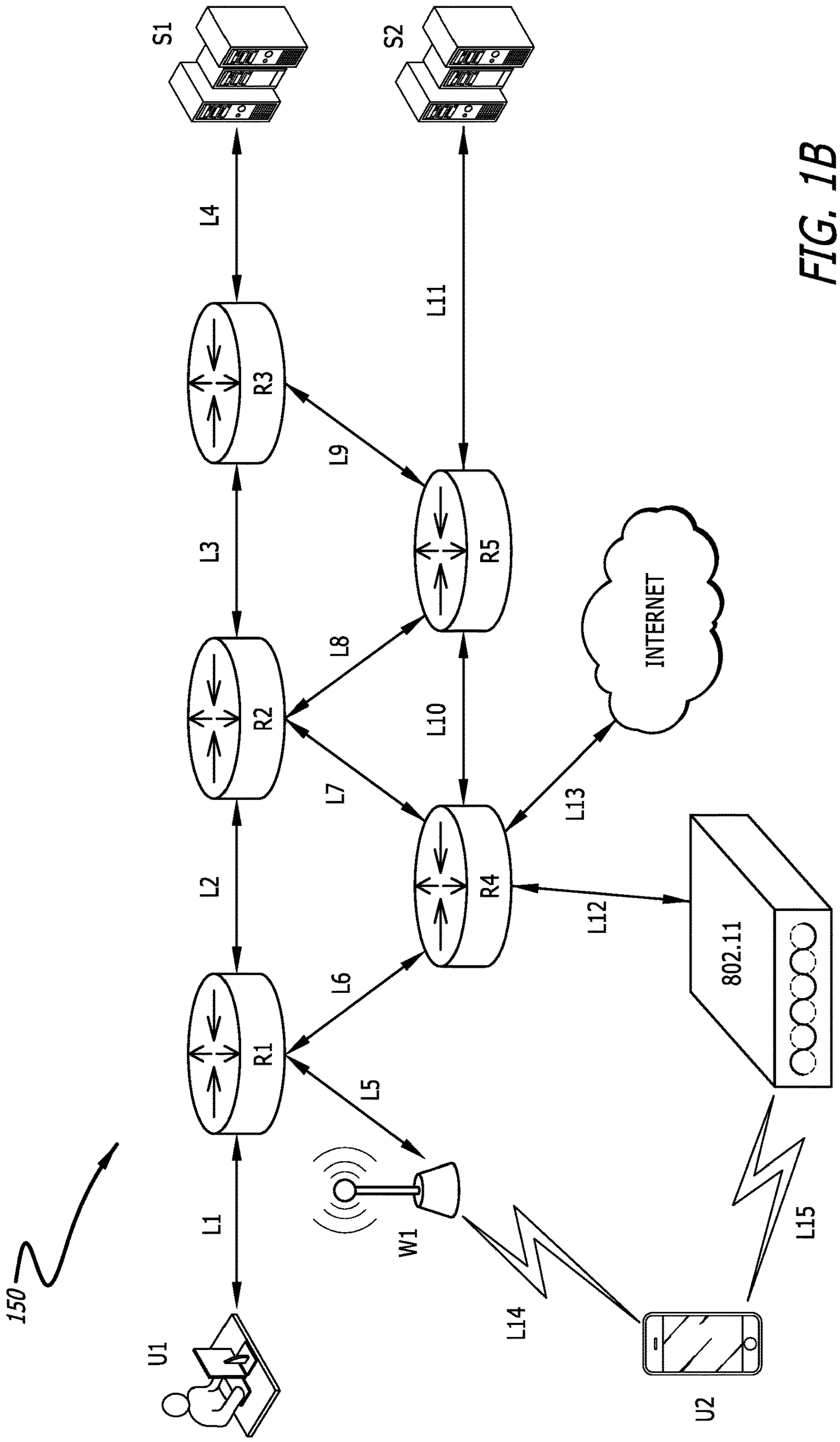
FIG. 1B is a block diagram of a network in accordance with an embodiment of the invention.

Referring to FIG. 1B, a block diagram of a network in accordance with an embodiment of the invention is shown. Exemplary network 150 may comprise five routers R1, R2, R3, R4, and R5. Also shown in the figure are two user computing devices U1 and U2, two wireless transceivers W1 and W2, two servers S1 and S2, and 15 links.

To summarize the links utilized in the embodiment depicted in FIG. 1B, link L1 may be a hardware connection between user computing device U1 and router R1. Link L2 may be a hardware connection between router R1 and router R2. Link L3 can be a hardware connection between router R2 and router R3. Link L4 is depicted as a hardware connection between router R3 and server S1. Link L5 may be a hardware connection between router R1 and wireless transceiver W1. Link L6 is shown as a hardware connection between router R1 and router R4. Link L7 can be a hardware connection between router R2 and router R4. Link L8 may be a hardware connection between router R2 and router R5. Link L9 is depicted as a hardware connection between router R3 and router R5. Furthermore, link L10 can be a hardware connection between router R4 and router R5. Link L11 may be a hardware connection between router R5 and server S2. Link L12 is shown as a hardware connection between router R4 and wireless transceiver W2.

Additionally, link L13 may be a hardware connection between router R4 and the Internet. Links 1 through 13 may be configured as an Ethernet connection (10/100/1000/10G) or some other protocol. Link L14 may be a wireless connection between wireless transceiver W1 and user computing device U2. This connection may be cellular (3G/4G/LTE/5G) or any other wireless protocol. Finally, link L15 may be a wireless connection between wireless transceiver W2 and user computing device U2. This connection may be Wi-Fi, Bluetooth, or any other wireless protocol.

The exemplary network 150 may be representative of a typical network topology, though real-world examples, like data centers, may be orders of magnitude more complex. The exemplary network 150 can allow end users to connect to data on servers like servers S1 and S2 or on the Internet with user computing devices U1 and U2. Data may be routed over the links from router to router (or switch to switch, not shown) until reaching the ultimate destination. The data may be returned to the user computing device like U1 and U2 by the same or a different path.

Figure 2:
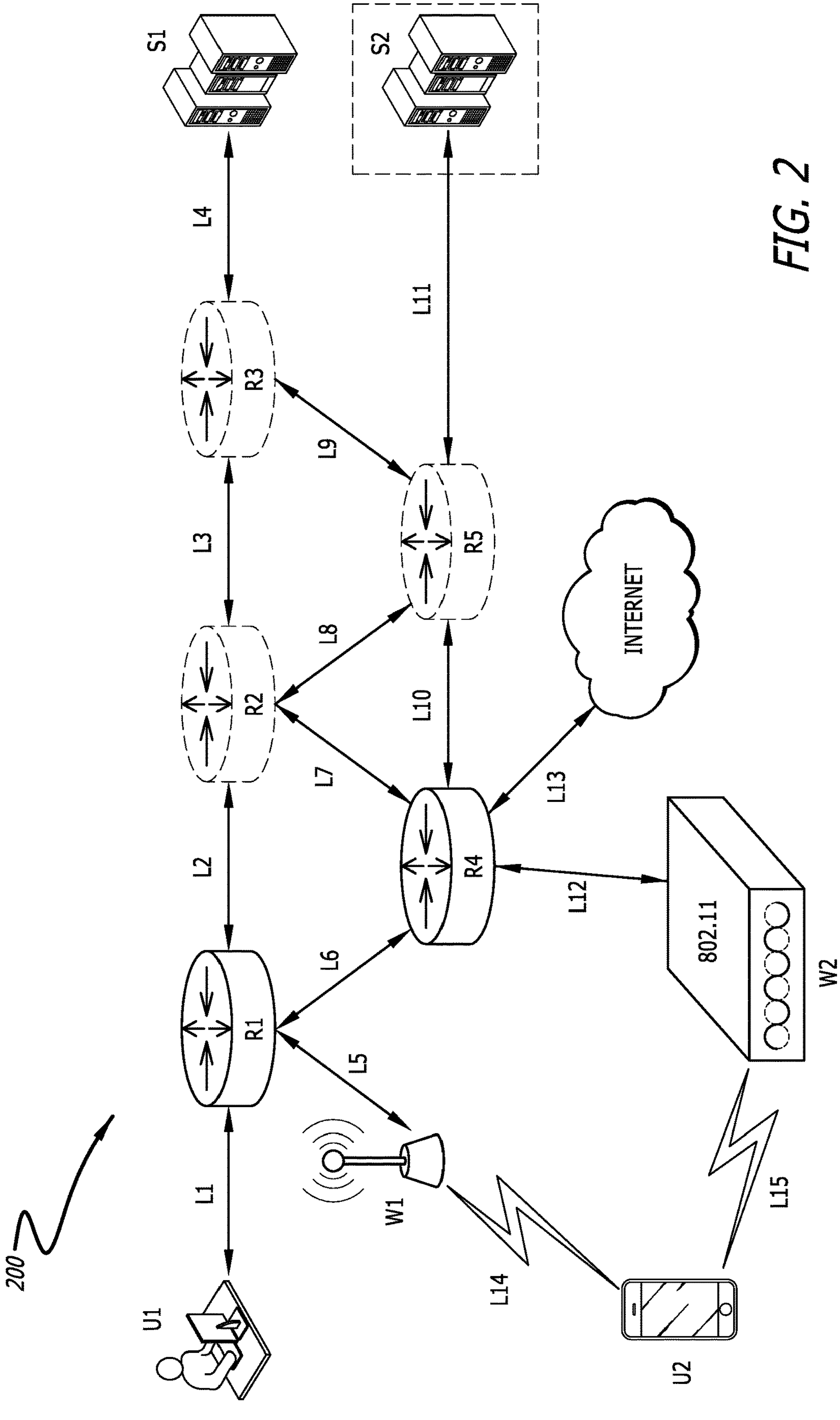
FIG. 2 is a block diagram of a network in accordance with an embodiment of the invention.

Referring to FIG. 2, a block diagram of a network in accordance with an embodiment of the invention is shown. Exemplary network 200 may comprise two hardware routers R1 and R4, and three virtual routers R3, R4, and R5. Also shown in the figure are two user computing devices U1 and U2, two wireless transceivers W1 and W2, a hardware server S1, a virtual server S2, and 15 links. The links coupled to virtual routers R3, R4, and R5 and virtual server S2 may be hardware, software, or some combination thereof. The links and their composition which are shown in FIG. 2 mirror those that were depicted in the embodiment of FIG. 1B.

The exemplary network 200 may be representative of a typical network topology, though real-world examples, like data centers, may be orders of magnitude more complex. The exemplary network 200 can allow end users to connect to data on servers like servers S1 and virtual server S2 or on the Internet with user computing devices U1 and U2. Data may be routed over the links from router to router (or switch to switch, not shown) until reaching the ultimate destination. The data may be returned to the user computing device like U1 and U2 by the same or a different path. From a user's perspective, virtual routers R2, R3, and R5 in FIG. 2 behave similarly to their hardware counterpart routers R2, R3, and R5 in the embodiment depicted in FIG. 1B.

Figure 3:
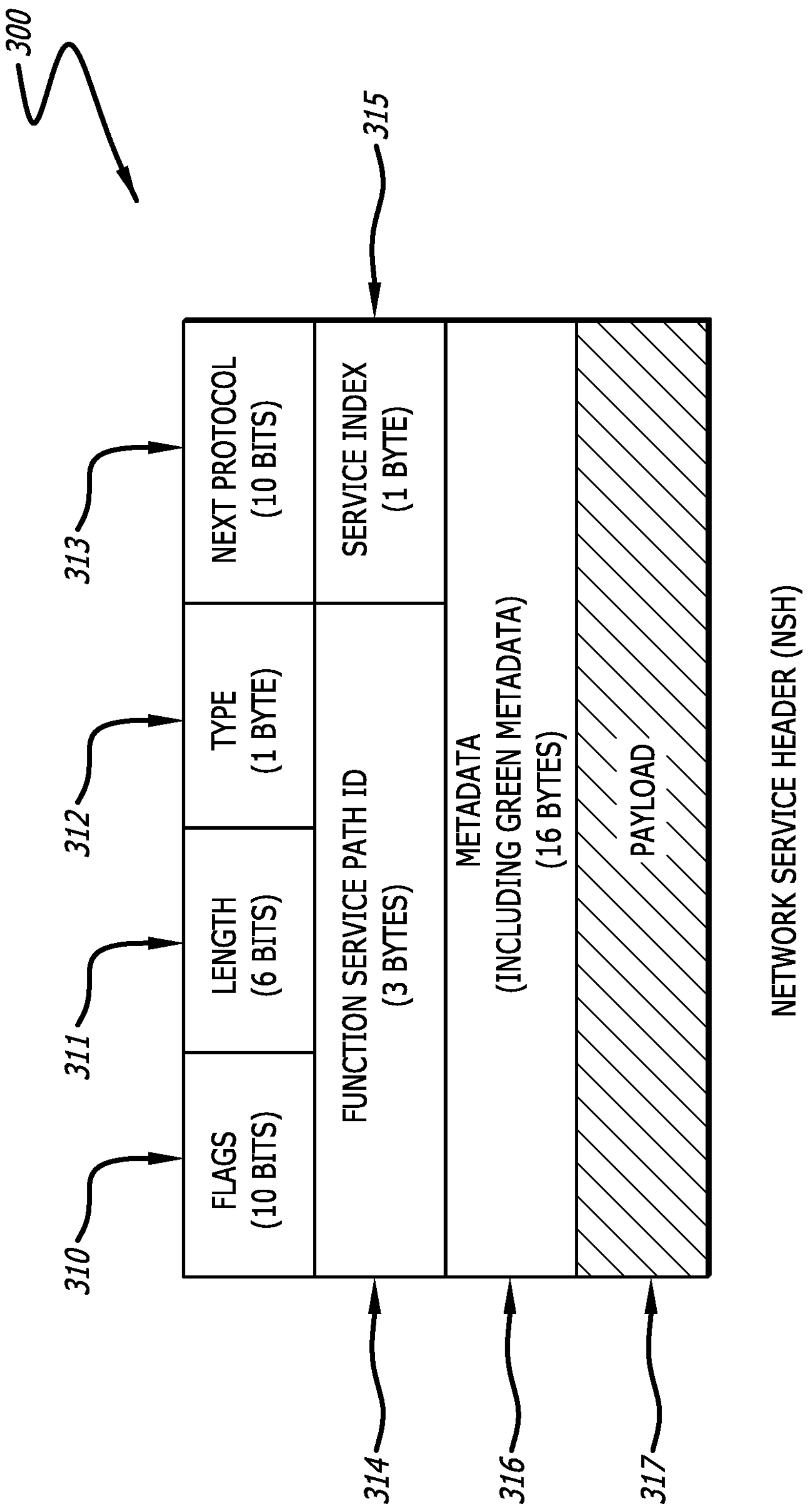
FIG. 3 is a conceptual diagram of a network service header in accordance with an embodiment of the invention.

Referring to FIG. 3, a conceptual diagram of a Network Service Header (NSH) in accordance with an embodiment of the invention is shown. The NSH 300 is encapsulated with a payload that forms an NSH packet. Typically, the NSH packet is further encapsulated as the payload of a larger packet to be transmitted somewhere in the network. At each destination, the larger packet and the NSH packet may be decapsulated, and the NSH 300 instructs the new destination on how to process the NSH packet.

NSH 300 may comprise a number of fields. Flags field 310 comprises ten bits, some of which contain status flags concerning the type of NSH packet which is to follow. Length field 311 may comprise 6 bits representing integer multiples of 4 bytes (63*4=252 bytes maximum) of the overall size of the NHS packet. Type field 312 comprises 8 bits or a single byte which determines the format of the metadata field 316. The next protocol field 313 specifies the type of protocol to use for the next NHS encapsulation of the payload.

A Service Function Path Identifier (SFP-ID) is a unique identifier assigned to a Service Function Path (SFP) in a computer network. An SFP is a sequence of network functions, such as firewalls, load balancers, and intrusion detection systems, through which packets pass as they traverse a network. The SFP-ID is typically included in the packet header as part of the metadata that guides the packet through the network.

When a packet enters the network, the SFP-ID is used to determine the sequence of network functions that the packet should pass through to reach its destination. This enables network administrators to create specific service paths for different types of network traffic, enabling them to enforce security policies, monitor network performance, and control bandwidth usage. Thus, the SFP-ID indicates what services are to be performed on the payload and the order thereof. There are 3 bytes (24 bits) giving about 16 million possible service paths. At each destination, the NHS forwarding table is searched to find the correct SFP-ID.

In many embodiments, a further node index may be utilized within the header. The node index can be associated with a node sequence which can be understood as the steps and/or locations the header and associated packet should travel through the network. The node index can be any field that can track where the packet is during travel in relation to the node sequence. In various embodiments, a Service Index (SI) field 315 may be utilized that can be configured to be a 1-byte indicator of how far the packet has progressed through the SFP-ID. At any destination where a service function is performed, the SI is decremented. Not all destinations involve performing a service function, in which case SI remains unchanged before the next NSH encapsulation. It is contemplated that additional configurations of a node index, such as the SI field 315 may occur as necessary to achieve the desired application of the disclosure.

Metadata field 316 may comprise up to 16 bytes of information—including any green metadata that may be used to make more sustainable choices with respect to routing destinations and services performed. Payload 317 may not part of the NSH, but it can immediately follow the metadata field 316 in the NSH packet.

Figure 4:
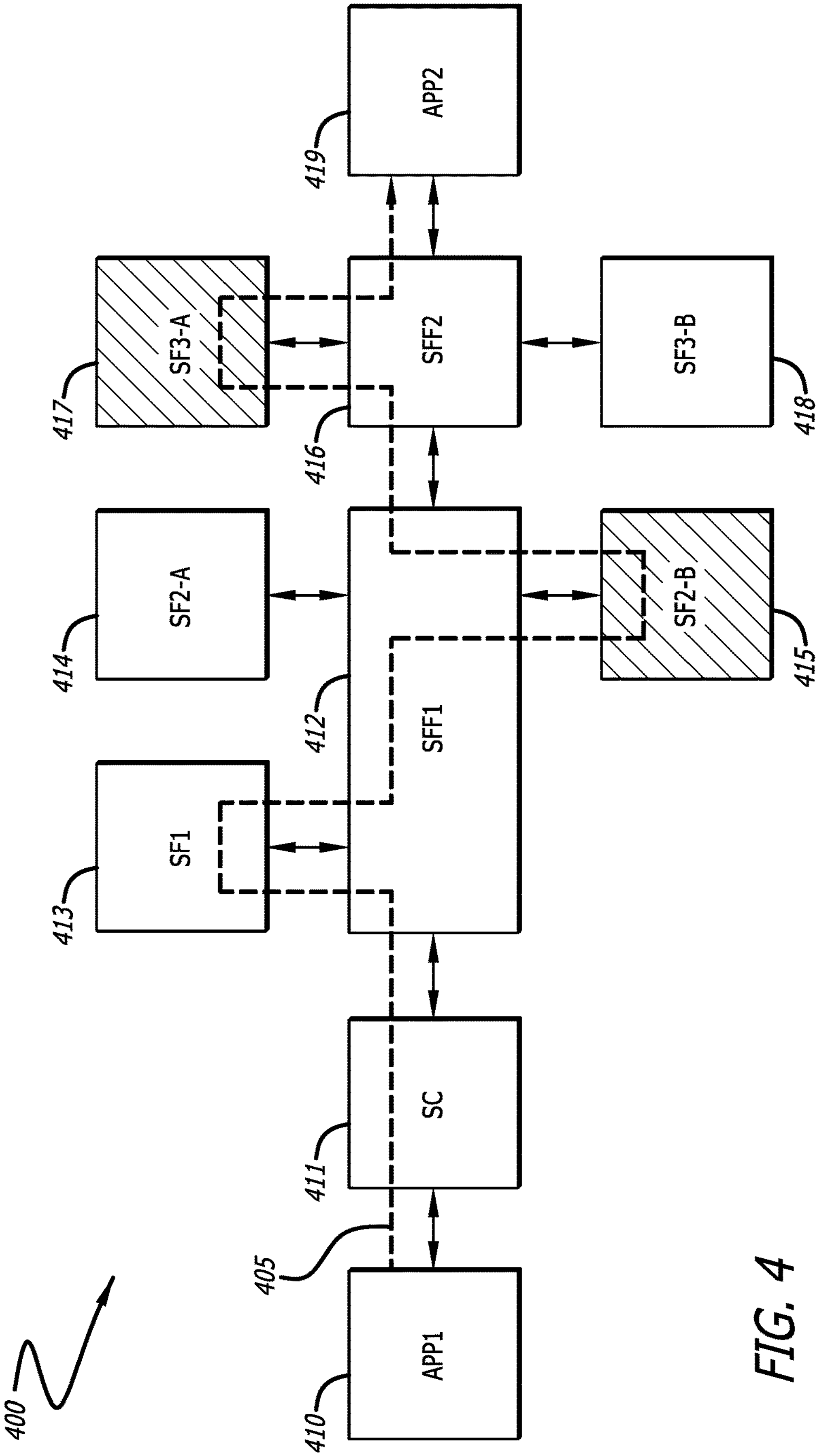
FIG. 4 is a block diagram of service chaining in accordance with an embodiment of the invention.

Referring to FIG. 4, a block diagram of service chaining in accordance with an embodiment of the invention is shown. Service chain 400 may show the path that an NSH packet 405 takes through the network from a first application (APP1) 410 through to a second application (APP2) 419. For simplicity, it is assumed that all of the destinations fall within the same Service Function Chain (SFC) domain.

APP1 may call for a service function at the point of origin (APP1 410). The first destination upon ingress to the SFC domain may be Service Classifier (SC) 411. After a packet enters the domain, the SC 411 may classify the packet, set service identifiers, and encapsulates the packet with packet headers. The next destination may be Service Function Forwarder (SFF1) 412. SFF1 412 analyzes the packet, determines that SF1 413 is the first service to be performed, and forwards the packet to SF1 413. SF1 413 may perform the service, decrement the SI field in the NSH, and re-encapsulate the packet for return to SFF1 412.

SFF1 412 may then ascertain that SF2 is the next service to be performed. There may be two available options: SF2-A 414 and SF2-B 415. SFF1 412 may analyze the green metadata in the NSH and may decide that SF2-B 415 (indicated by the shaded box) is the more sustainable option and forwards the packet to SF2-B 415. SF2-B 415 may perform the service, decrement the SI field in the NSH, and re-encapsulate the packet for return to SFF1 412.

SFF1 412 may then ascertain that SF3 is the next service to be performed and may forward the packet to SFF2 416. There may be two available options: SF3-A 417 and SF3-B 418. SFF2 416 may analyze the green metadata in the NSH and may decide that SF3-A 417 (indicated by the shaded box) is the more sustainable option and forwards the packet to SF3-A 417. SF3-A 417 may perform the service, decrement the SI field in the NSH, and re-encapsulate the packet for return to SFF2 416. SFF2 416 may then analyze the packet, ascertain that the service chain is complete, and forward the packet to application APP2 419. In some embodiments, APP1 410 and APP2 419 may be the same application or two different parts of the same application. In such embodiments, this represents the user requesting and receiving the service functions performed.

Figure 5:
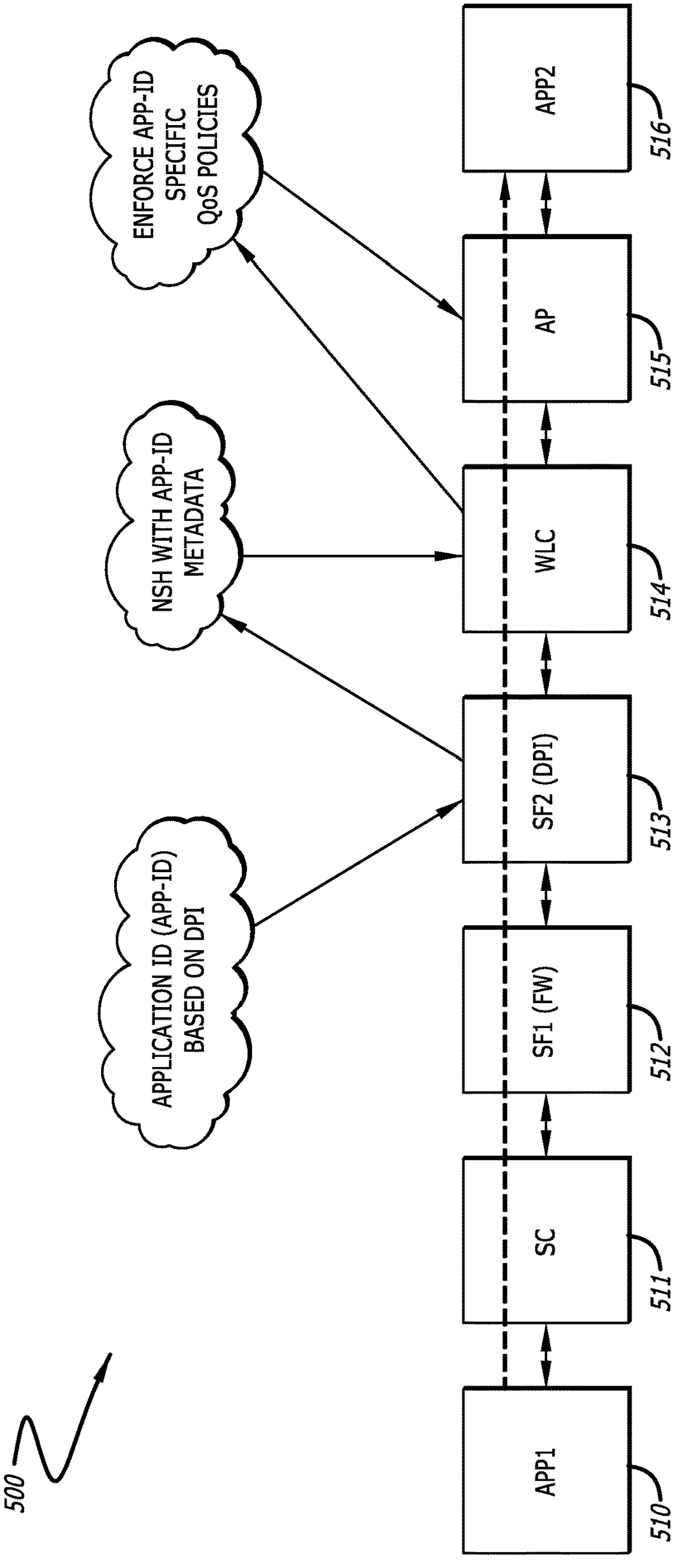
FIG. 5 is a block diagram of service chaining in accordance with an embodiment of the invention.

Referring to FIG. 5, a block diagram of service chaining in accordance with an embodiment of the invention is shown. Service chain 500 may show the path that an NSH packet takes through the network from a first application 510 (APP1) through to a second application 516 (APP2). For simplicity, it is assumed that all of the destinations fall within the same Service Function Chain (SFC) domain.

The first stop upon ingress to the SFC may be Service Classifier 511 (SC). After a packet enters the domain, the SC 511 may classify the packet, set service identifiers, and encapsulate the packet with service packet headers. The first stop may be SF1 512, which may be a firewall (FW) or some other service function. The second stop may be SF2 513, which may be a Deep Packet Inspection (DPI) service or some other service function. The DPI may reveal an application ID 520 (APP-ID). SF2 513 may include the APP-ID into the NSH 521 for the next stop at Wireless LAN Controller 514 (WLC).

WLC 514 may communicate to a wireless Access Point 515 (AP) to enforce APP-ID specific Quality of Service (QoS) policies—including using the green metadata in the NSH. This might include powering down an access point if there are multiple access points available to the WLC 514 and choosing to keep active the most sustainable, such as AP 515. If all services have been performed, AP 515 may then analyze the packet, ascertain that the service chain is complete, and forward the packet to application APP2 516.

Figure 6A:
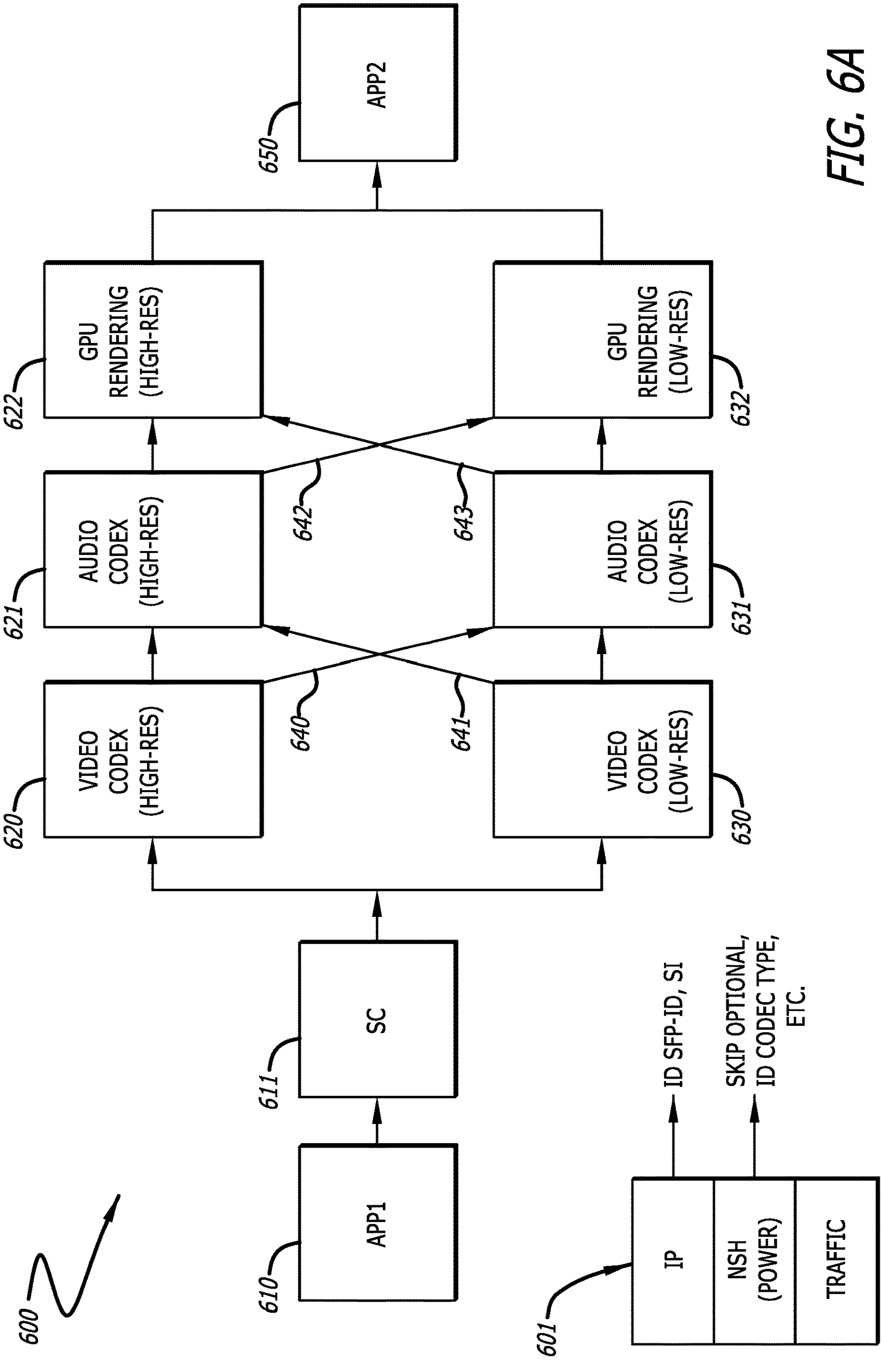
FIG. 6A is a block diagram of service chaining in accordance with an embodiment of the invention.

Referring to FIG. 6A, a block diagram of service chaining in accordance with an embodiment of the invention is shown. In many embodiments, the service chain 600 may have a plurality of paths for exemplary streaming video functions. A service request is made by APP1 610 at the origin point, which includes an NSH 601 or other similar protocol (not shown). NSH 601 may be combined with a payload to create a packet to forward to the service chain 600. The destination upon ingress to the SFC may be Service Classifier 611 (SC). After a packet enters the domain, the SC 611 may classify the packet, set service identifiers, and encapsulates the packet with the service packet headers. The next destination may be high-resolution video codex 620 or low-resolution video codex 630. The second destination may be high-resolution audio codex 621 or low-resolution audio codex 631. Links 640 and 641 allow a choice of audio codex regardless of the choice of video codex.

The next destination may be high-resolution Graphics Processing Unit (GPU) rendering 623 or low-resolution GPU rendering 633. Links 642 and 643 allow a choice of GPU rendering regardless of the choice of audio codex. Once rendered, the output from high-resolution Graphics Processing Unit (GPU) rendering 623 or low-resolution GPU rendering 633 may be sent to APP2 650 at the final destination point. In some embodiments, APP1 610 and APP2 650 may be the same application or two different portions of the same application. In general, there may be a tradeoff to be made between high performance and sustainability. The choice of various paths from APP1 610 to APP2 650 may use the most sustainable options consistent with the requirements from APP1 610. Persons skilled in the art will appreciate that the entire video processing may take place on a single compute node and that some or all of the services may be virtual.

Figure 6B:
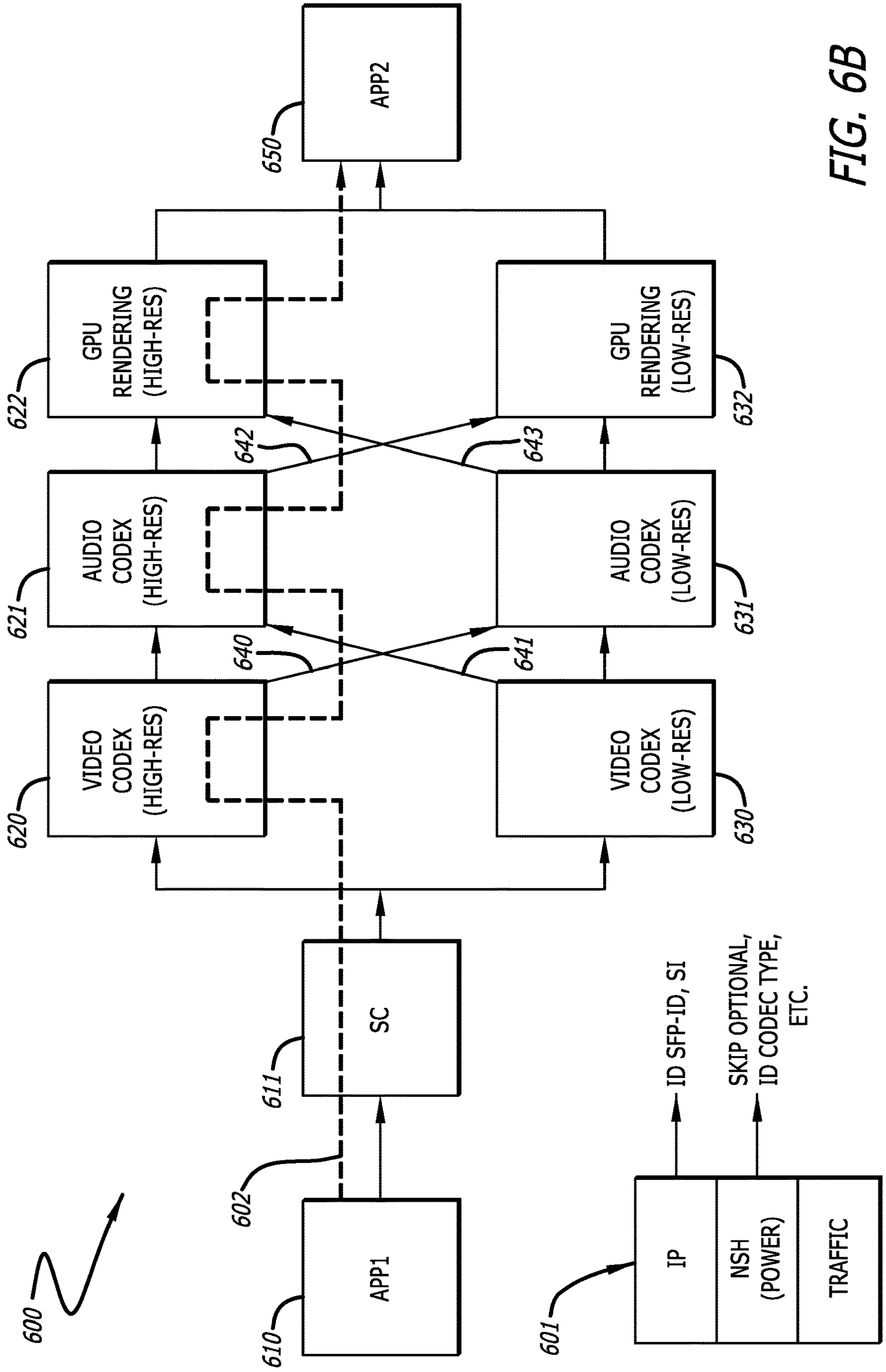
FIG. 6B is a block diagram of service chaining in accordance with an embodiment of the invention.

Referring to FIG. 6B, a block diagram of service chaining in accordance with an embodiment of the invention is shown. A service request is made by APP1 610 at the origin point, which includes an NSH 601 or other similar protocol (not shown). NSH 601 may be combined with a payload to create a packet to forward to the service chain 600. Exemplary service chain 600 may have a plurality of paths for streaming video functions. In this case, video 602 from APP1 610 to APP2 650 may be passing through the high-resolution video codex 620, the high-resolution audio codex 621, and the high-resolution GPU rendering 622. This is a path that might be used for a high-quality display device like a UHD television.

Figure 6C:
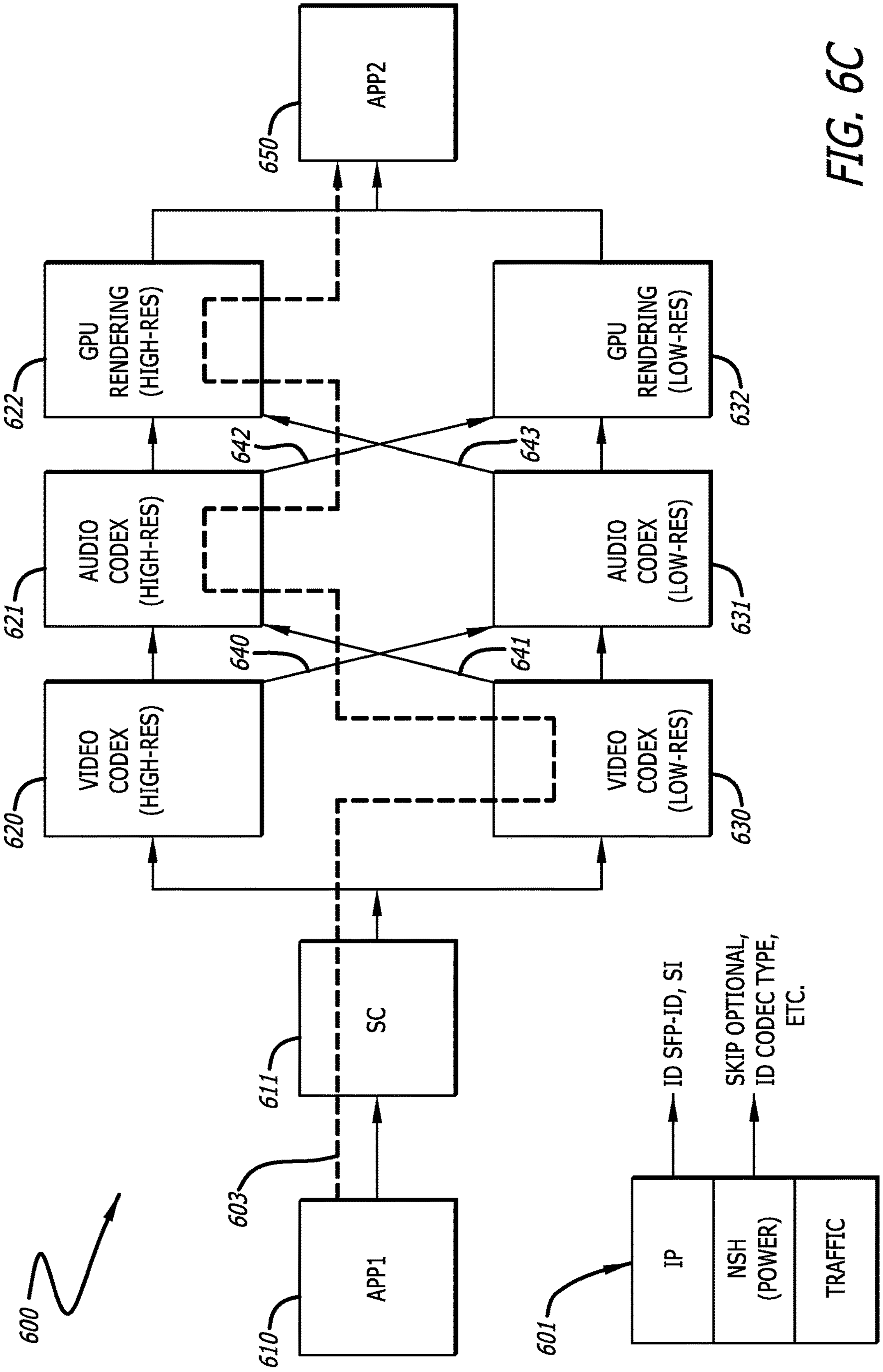
FIG. 6C is a block diagram of service chaining in accordance with an embodiment of the invention.

Referring to FIG. 6C, a block diagram of service chaining in accordance with an embodiment of the invention is shown. A service request is made by APP1 610 at the origin point, which includes an NSH 601 or other similar protocol (not shown). NSH 601 may be combined with a payload to create a packet to forward to the service chain 600. Exemplary service chain 600 may have a plurality of paths for streaming video functions. In this case, video 603 from APP1 610 to APP2 650 may be passing through the low-resolution video codex 630, the high-resolution audio codex 621, and the high-resolution GPU rendering 622. This is a path that might be used for a display device with a small screen but good audio playback like a cellphone.

Figure 6D:
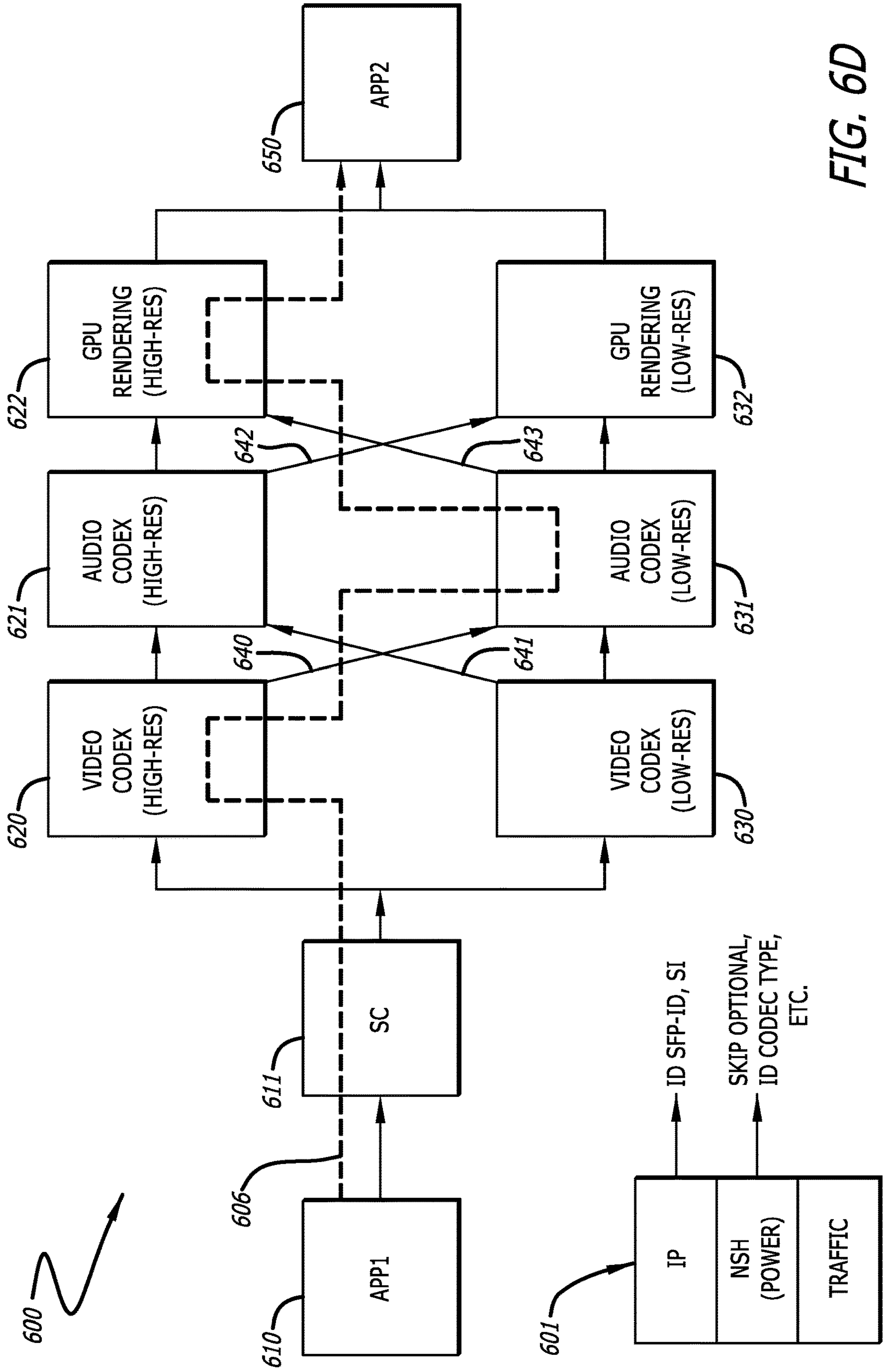
FIG. 6D is a block diagram of service chaining in accordance with an embodiment of the invention.

Referring to FIG. 6D, a block diagram of service chaining in accordance with an embodiment of the invention is shown. A service request is made by APP1 610 at the origin point, which includes an NSH 601 or other similar protocol (not shown). NSH 601 may be combined with a payload to create a packet to forward to the service chain 600. Exemplary service chain 600 may have a plurality of paths for streaming video functions. In this case, video 604 from APP1 610 to APP2 650 may be passing through the high-resolution video codex 620, the low-resolution audio codex 631, and the high-resolution GPU rendering 622. This is a path that might be used for a display device with a large screen but limited audio playback like an advertising kiosk in a shopping mall.

Figure 7:
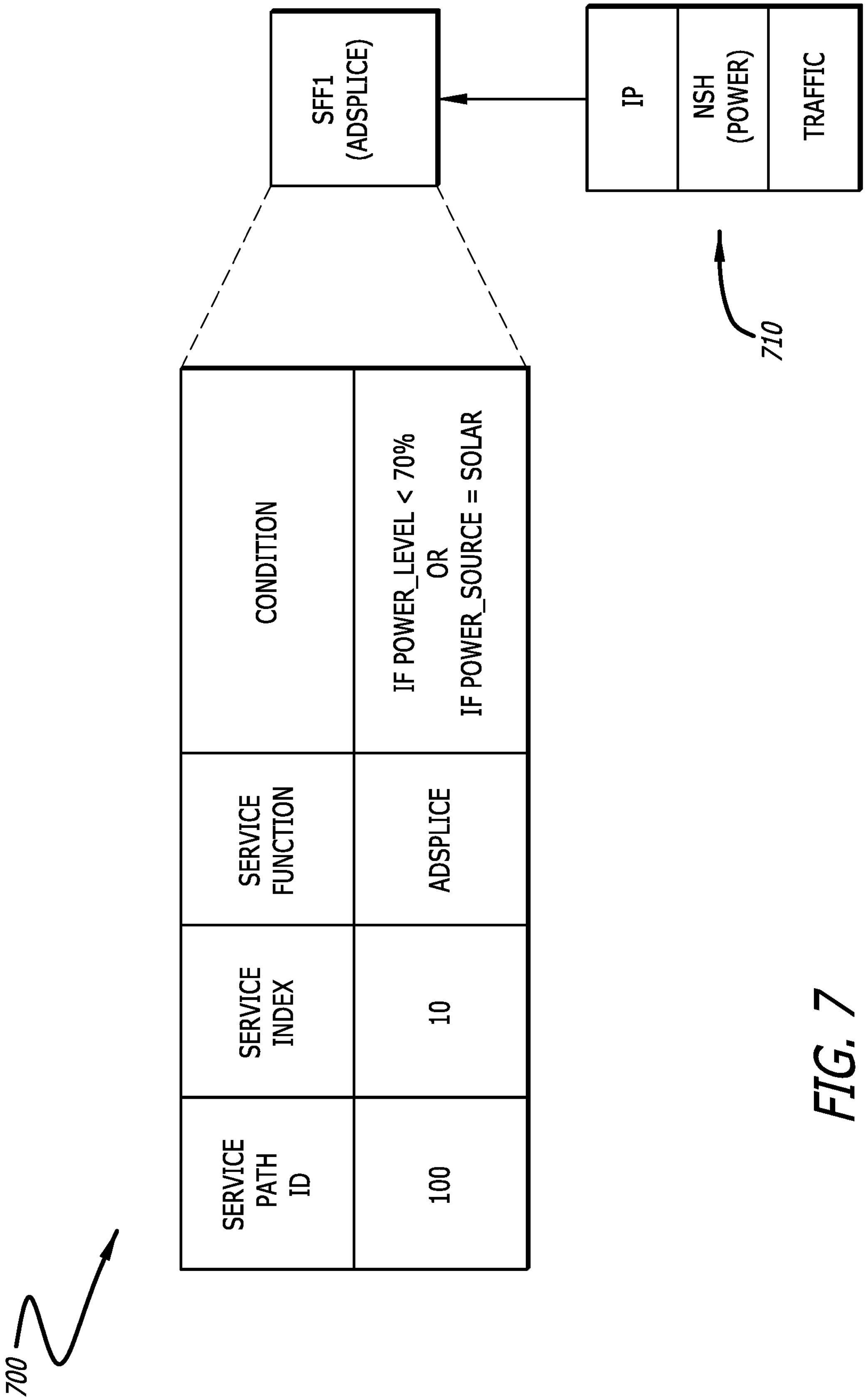
FIG. 7 is a block diagram illustrating a conditional execution of services.

Referring to FIG. 7, a block diagram illustrating the conditional execution of services is shown. In the figure, an exemplary conditional instruction 700 in the middle of a service chain is shown. A service request for an "adsplice" is made and is specified in the NSH 710. Ad splicing means interrupting the normal video stream with a commercial. In this particular instance, the adsplice function will only be executed if the power level of the target device is below the threshold of 70% or if the power is coming from a sustainable source like solar power.

Referring to FIG. 8A, a flowchart of a process 800A of the operation of a network in accordance with an embodiment of the invention is shown. Process 800A may begin by preparing and transmitting to the network a service function call in a packet. The packet may be received at a first destination where it is processed, analyzed, re-encapsulated into a second packet, and transmitted to the network. The packet may be received at a second destination where it is processed, a service function is performed, and the results are encapsulated and transmitted to the network.

Referring to FIG. 8B, a flowchart of a process 800B of the operation of a network in accordance with an embodiment of the invention is shown. Process 800B may begin when an application initiates a call for a Service Function (SF) (block 810). This may need a Service Function Path Identifier (SFP-ID) and a Service Index (SI) to be created (block 812). The SFP-ID will contain a list of network services to be provided, while the SI will be set to point at the location of the first SF to be executed. A first header may be generated comprising the SFP-ID, the SI, and relevant green metadata (block 814). The first header and a first payload may be compiled into a first packet (block 816) and transmitted to the network (block 818).

Referring to FIG. 8C, a flowchart of a process 800C of the operation of a network in accordance with an embodiment of the invention is shown. Process 800C may begin when the first packet may be received at a first destination point (block 820) and then processed there (block 822). The SFP-ID, the SI, and the green metadata may be read from the first header at the first destination point (block 824). The SFP-ID and SI may be used to determine the SF to be performed (block 826). A second destination point where the SF is to be performed may be located, wherein the second destination point is determined using, at least in part, the green metadata (block 828). A second header comprising the SFP-ID, the SI, and the green metadata may be generated. The second header and the first payload may be compiled into a second packet (block 632), and the second packet may be transmitted to the network (block 634).

Referring to FIG. 8D, a flowchart of a process 800D of the operation of a network in accordance with an embodiment of the invention is shown. Process 800D may begin when the second packet may be received at a second destination point (block 836) and then processed there (block 838). The SFP-ID, the SI, and the green metadata may be read from the second header at the second destination point (block 840). The SFP-ID and SI may be used to determine the SF to be performed (block 842). The SF may be performed at the second destination point, and the first payload may be modified into a second payload (block 844). The SI may be decremented (block 846). A third header comprising the SFP-ID, the decremented SI, and the green metadata may be generated (block 848). The third header and the second payload may be compiled into a third packet (block 850). The third packet may be transmitted to the network (block 852). The third packet may be received at the third destination point (block 854) and then processed there (block 856).

Figure 9:
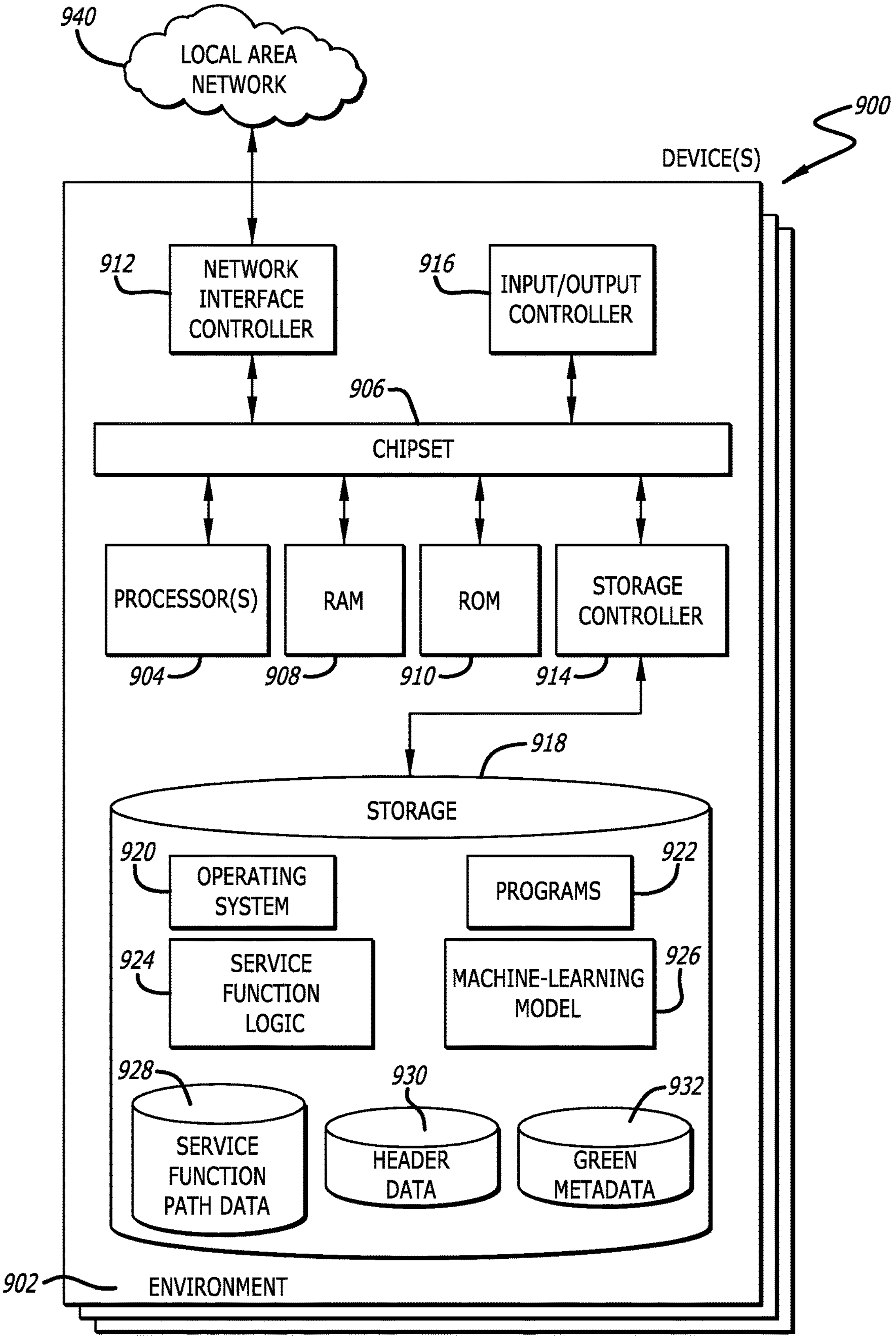
FIG. 9 is a conceptual block diagram of a device suitable for use in with various embodiments of the disclosure.

Referring to FIG. 9, a conceptual block diagram of a device suitable for use in with various embodiments of the disclosure is shown. Referring to FIG. 9, a conceptual block diagram of one or more devices 900 suitable for use in a sustainable cross-domain data distribution infrastructure in accordance with various embodiments of the disclosure is shown. In a number of embodiments, the device may be a sustainability aggregation device. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units (CPUs) can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, programs 922, and data, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more computer devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as a program 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-7. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a service function logic 924. As discussed previously, various devices may be configured to transmit or receive service function chains and associated headers. In these devices, a service function logic 924 may operate to carry out one or more processes needed to facilitate those operations. In certain embodiments, the service function logic 924 may be embedded as a separate logic within the device. In additional embodiments, the service function logic 924 can be located remotely and be called upon to facilitate operations as described herein.

In a number of embodiments, the storage 918 can include service function path data 928. Service function path data 928 may include one or more service function paths that are required by a service function, device, etc. In further embodiments, the service function path data 928 may be stored within storage 918. However, in some embodiments, the processing of incoming packets may contain service function path data 928 that can be transitionally stored within storage 918 for processing of the associated packets. In more embodiments, the service function path data 928 may comprise SFP-ID data.

In various embodiments, the storage 918 can include header data 930. As described above, header data 930 can include an node index associated with a node sequence and other data indicating the process the packet has travelled during its path along the service function chain. In some embodiments, the header data 930 may comprise SI data. As those skilled in the art will recognize, header data 930 may comprise additional data associated with the packet depending on the application desired.

In still more embodiments, the storage 918 can include green metadata 932. As described above, green metadata 932 can comprise a number of metrics, scores, or other data that relates to both power source type data and one or more sustainability-related capabilities within one or more network devices. Power source type data may include one or more negative environmental impacts from using the device, whereas sustainability-related capabilities may provide a list of available configurations for the device that can be adjusted to potentially reduce energy usage over time.

Finally, in many embodiments, data may be processed into a format usable by a machine-learning (ML) model 926 (e.g., feature vectors), and or other pre-processing techniques. The ML model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. In some embodiments, the ML model 926 may be configured to optimize the selection or transmission of compiling packets with various types of data. This may allow for a more efficient transmission of packets across a network.

Although a specific embodiment for a device 900 suitable for use in a sustainable cross-domain data distribution infrastructure is described above with respect to FIG. 9, any of a variety of systems and/or processes may be utilized in accordance with embodiments of the disclosure. For example, the device 900 may be configured to carry out additional operations wherein the service function logic 924 is a secondary function of the device 900. In this way, a typical network device may be configured or converted to carry out the steps and processes associated with the sustainability aggregation entities that are described above. In additional embodiments, the device 900 may be virtualized and sold as a service to one or more external networks/domains. The elements depicted in FIG. 9 may also be interchangeable with other elements of FIGS. 1-8 as required to realize a particularly desired embodiment.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public, regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

one or more processors;

a communications interface;

a non-transitory computer-readable storage media, that when executed by the one or more processors, directs the device to:

initiate a call for a service function by an application;

create an identifier for a service function path and a field suitable for storing a node index associated with a node sequence within a path;

generate a first header comprising the identifier for the service function path, the node index, and green metadata;

compile the first header and a first payload into a first packet;

receive the first packet at a first destination point;

determine a service function to be performed;

determine a second destination point where the service function is to be performed, using the green metadata; and transmit the first packet to a network; and a service function forwarder configured to:

analyze the first packet to determine a first service function to be performed based on the identifier for the service function path and the node index;

forward the first packet to the first service function; and cause the first service function to perform a service, decrement the node index, and re-encapsulate the first packet.

2. The device of claim 1, wherein the node index is a Service Index (SI).

3. The device of claim 2, wherein the identifier for the service function path is a Service Function Path Identifier (SFP-ID).

4. The device of claim 3, wherein the device is further directed to:

receive a second packet from the network;

process the second packet; and read the SFP-ID, the SI, and the green metadata associated with the second packet.

5. The device of claim 4, wherein the device is further directed to:

determine if all services have been performed;

determine if the device is the device of origin; and return a second payload to the application.

6. The device of claim 1, wherein the green metadata comprises at least one of: geolocation of Network Entities (NEs), power modes of NEs, energy types powering NEs, efficiency of NEs, or battery levels of NEs.

7. The device of claim 1, wherein:

the first header is a Network Service Header (NSH); and the green metadata comprises, at least in part, an application identification (APP-ID).

8. A device, comprising:

one or more processors;

a communications interface;

a non-transitory computer-readable storage media, that when executed by the one or more processors, directs the device to:

receive a first packet via the communications interface at a first destination point;

process the first packet to extract a first header and a first payload;

determine that the first packet is a service function request;

read an identifier for a service function path, a node index, and green metadata from the first header; and determine a second destination point where the service function is to be performed, using the green metadata; and a service function forwarder configured to:

analyze the first packet to determine a first service function to be performed based on the identifier for the service function path and the node index;

forward the first packet to the first service function; and cause the first service function to perform a service, decrement the node index, and re-encapsulate the first packet.

9. The device of claim 8, wherein the node index is a Service Index (SI).

10. The device of claim 9, wherein the identifier for the service function path is a Service Function Path Identifier (SFP-ID).

11. The device of claim 10, wherein the device is further directed to:

determining from the SFP-ID and the SI what service function (SF) is to be performed; and determining from the green metadata where a service function is to be performed.

12. The device of claim 11, wherein the device is further directed to:

performing the SF on the first payload to generate a second payload;

decrement the SI;

generating a second header from the SFP-ID, the decremented SI, and the green metadata;

compiling the second header and the second payload into a second packet; and transmitting the second packet to a network.

13. The device of claim 12, wherein the green metadata comprises at least one of: geolocation of Network Entities (NEs), power modes of NEs, energy types powering NEs, efficiency of NEs, or battery levels of NEs.

14. The device of claim 11, wherein Network Entities (Nes) comprise at least one of: servers, routers, switches, disk arrays, wireless LAN controllers, wireless access points, cellular access points, or client computers.

15. A method, comprising:

initiating a call for a service function by an application;

creating a Service Function Path Identifier (SFP-ID) and a Service Index (SI);

generating a first header comprising the SFP-ID, the SI, and green metadata;

compiling the first header and a first payload into a first packet;

receiving the first packet at a first destination point;

determining a service function to be performed;

determining a second destination point where the service function is to be performed; and transmitting the first packet to a device over a network utilizing a service function forwarder to:

analyze the first packet to determine a first service function to be performed based on the identifier for the service function path and the node index;

forwarding the first packet to the first service function; and causing the first service function to perform a service, decrement the node index, and re-encapsulate the first packet.

16. The method of claim 15, wherein the method further comprises:

receiving a second packet from the network;

processing the second packet; and reading the SFP-ID, the SI, and the green metadata associated with the second packet.

17. The method of claim 16, wherein the method further comprises:

determining if all services have been performed;

determining if the device is the device of origin; and returning a second payload to the application.

18. The method of claim 16, wherein the green metadata comprises at least one of: geolocation of Network Entities (NEs), power modes of NEs, energy types powering NEs, efficiency of NEs, or battery levels of NEs.

19. The method of claim 18, wherein the NEs comprise at least one of: servers, routers, switches, disk arrays, wireless LAN controllers, wireless access points, cellular access points, or client computers.

20. The method of claim 15, wherein the first header comprises at least one of: a Network Service Header (NSH), a Segment Routing IPV6 (SRv6) header, or a Multi-Protocol Label Switching (MPLS) header.

* * * * *